Dec. 4, 1928.
C. D. CUTTING
1,693,594
UNIVERSAL JOINT
Filed Dec. 30, 1927
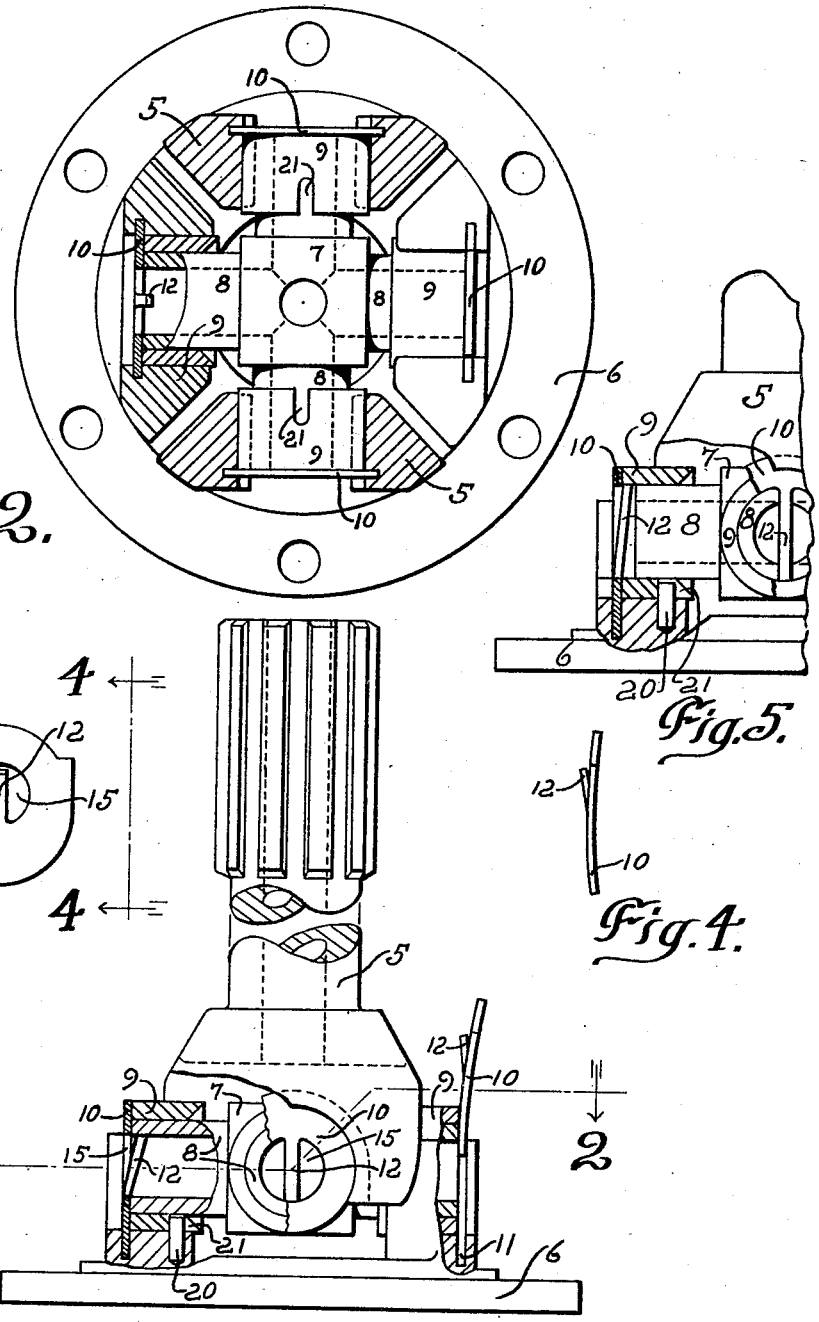

Patented Dec. 4, 1928.

1,693,594

UNITED STATES PATENT OFFICE.

CHARLES D. CUTTING, OF DETROIT, MICHIGAN.

UNIVERSAL JOINT.

Application filed December 30, 1927. Serial No. 243,543.

My invention contemplates the provision of a simple, economical and efficient end thrust bearing piece for universal joints, and more particularly has for its object the provision of simple means for securing the end thrust bearing piece in place.

With the above and other objects in view, my invention consists in the arrangement, combination and construction of the various parts of my improved device, as described in the specification, claimed in my claims and shown in the accompanying drawing, in which:

Fig. 1 is a plan view of a universal joint embodying my invention, certain parts being broken away to illustrate portions thereof in section.

Fig. 2 is a sectional view taken on line 2—2 of Fig. 1.

Fig. 3 is a plan view of the end thrust bearing piece utilized in my invention.

Fig. 4 is a view taken on line 4—4 of Fig. 3.

Fig. 5 is a view partly in plan and partly in section showing a portion of a universal joint wherein a modification of my invention is employed.

I have shown a universal joint comprising generally yokes 5 and 6 and a cross member comprising a central portion 7 and four bearing arms 8. Each of the bearing arms may be of hollow construction, or may be provided with recesses adjacent their outer ends.

The bearing arms of the cross are positioned in the yoke arms, conventional bearing sleeves 9 being placed in the yoke arms to receive the cross arms.

In order to provide end thrust bearings for the cross arms I have provided bearing members or plates 10 which are adapted to be inserted in slots 11 provided in each of the yoke arms adjacent the ends of the cross arms. The bearing pieces 10 are originally of arc shape, as shown particularly in Fig. 4, so that when they are pressed into the slots 11 they will be straightened and will be held in the slot under spring tension.

In order to secure the bearing pieces in the yokes they are provided with tongues 12 which normally extend at an angle to the body of the bearing pieces. As is particularly shown in Fig. 1, these tongues normally extend inwardly toward the central portion of the cross. When the bearing pieces are being pushed into their slots, the tongues will assume positions in alignment with the remainder of the bearing pieces until such a time as the upper ends thereof pass the rims of their adjacent cross arms when the inherent tension of the tongues will cause them to spring inwardly into the hollow portions of the adjacent bearing arms where they will be held against outward displacement owing to the ends of the fingers striking the inside of the cross arm whenever there is any tendency of the bearing piece to move outwardly in the slot.

In order to disassemble the parts it is necessary that a tool be extended into the aperture 15 provided in each of the bearing pieces 10 for the purpose of bending the spring fingers outwardly until they clear the ends of the cross arms. When this has been done the bearing pieces may be lifted out of the slots and the parts disassembled.

For the purpose of preventing rotation of the sleeves 9 in the yoke arms, I provide pins 20, each of which engage a yoke arm at one end and a slot 21 in a sleeve 9 at the other end.

It is well known that in the propeller shafts of some automobiles only on universal joint is employed and that in such constructions the cross arms must be permitted end play. When my improved end thrust member is employed in such a construction, it bears only against the bearing sleeve 9, acting to prevent dislocation of the same. In this construction, which is illustrated in the modification of Fig. 5, the tongues 12 engage the inner periphery of the sleeves to prevent dislocation of the end thrust piece.

It will be obvious that various changes may be made in the arrangement, combination and construction of the various parts of my improved device without departing from the spirit of my invention, and it is my intention to cover by my claims such changes as may reasonably be included within the scope thereof.

What I claim is:

1. A universal joint including a yoke member having an oscillatable piece therein, an end thrust bearing member for said piece positioned at the end thereof and carried by the yoke independently of the piece and means for holding said bearing member against dislocation relative to said piece, comprising interengaging parts on the piece and bearing member.

2. A universal joint including a yoke member having an oscillatable piece therein, an end thrust bearing member for said piece positioned at the end thereof and carried by the yoke independently of the piece and means for holding said bearing member against dislocation relative to said piece, comprising a tongue on one of said parts, and a recess in the other in which said tongue may engage.

3. A universal joint including a yoke member having an oscillatable piece therein, an end thrust bearing member for said piece and means for holding said bearing member against dislocation relative to said piece, comprising a slot in the yoke member into which the bearing member is pressed, and a tongue on the bearing member engageable in a recess on the piece.

4. A universal joint including a yoke member having an oscillatable piece therein, an end thrust bearing member for said piece and means for holding said bearing member against dislocation relative to said piece, comprising a slot in the yoke member into which the bearing member is pressed, and a tongue on the bearing member engageable in a recess on the piece, said tongue lying in a plane different than the plane of the bearing member and being automatically engaged in said recess when the bearing member is assembled.

5. A universal joint including a yoke member having an oscillatable piece therein, said yoke having a slot therein adjacent an end of said piece, an end thrust bearing member for said piece insertible in said slot and means forming a part of said bearing member for holding it against dislocation from the slot after it has been assembled.

6. A universal joint including a yoke member having an oscillatable piece therein, said yoke having a slot therein adjacent an end of said piece, an end thrust bearing member for said piece insertible in said slot and a tongue member on the end thrust bearing member engaging said piece when the bearing member has been assembled, to thereby hold the bearing member against dislocation.

7. A universal joint including a yoke member having a radial bearing piece thereing, an end thrust member for said piece positioned at the end thereof and carried by the yoke independently of the piece and means for holding the end thrust member against dislocation, comprising interengaging parts on the said piece and end thrust member.

8. A universal joint including a yoke member having a radial bearing piece therein, an end thrust member for said piece positioned at the end thereof and carried by the yoke independently of the piece and means for holding the end thrust member against dislocation, comprising a recess in the piece and a tongue on the end thrust bearing engaging in the recess.

9. A universal joint including a yoke member having a slot in at least one of its arms, a radial bearing piece in said arm having one end positioned adjacent said slot, a member inserted in said slot forming an end thrust element for said radial bearing piece, and interengaging parts on said piece and member, when they are assembled, to prevent dislocation of said member.

10. A universal joint including a yoke member having a slot in at least one of it arms, a radial bearing piece in said arm having one end positioned adjacent said slot, a member inserted in said slot forming an end thrust element for said radial bearing piece, and a tongue on said member engaging the said piece, when the parts are assembled, to prevent dislocation of the said member.

11. A universal joint comprising bearing members and a supporting yoke structure for said members, end thrust members positioned at the ends of the bearing members and carried by the supporting yoke structure independently of the bearing members and interengaging parts on the bearing members and end thrust members preventing dislocation of them relative to each other.

CHARLES D. CUTTING.